(12) United States Patent
Wu et al.

(10) Patent No.: US 9,374,238 B2
(45) Date of Patent: Jun. 21, 2016

(54) MULTICAST GROUP TRANSMISSION METHOD AND WIRELESS NETWORK APPARATUS USING THE SAME

(71) Applicant: ACCTON TECHNOLOGY CORPORATION, Hsinchu (TW)

(72) Inventors: Szu-Cheng Wu, Hsinchu (TW); Tan-Chun Lu, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 297 days.

(21) Appl. No.: 13/783,932

(22) Filed: Mar. 4, 2013

(65) Prior Publication Data

US 2013/0235772 A1    Sep. 12, 2013

(30) Foreign Application Priority Data

Mar. 6, 2012  (TW) .............................. 101107443 A

(51) Int. Cl.
*H04L 12/18* (2006.01)

(52) U.S. Cl.
CPC ............... *H04L 12/189* (2013.01); *Y02B 60/50* (2013.01)

(58) Field of Classification Search
CPC .... Y02B 60/50; H04L 12/189; H04L 12/185; H04W 52/0216; H04W 4/06; H04W 72/005; H04W 52/0219
See application file for complete search history.

(56) References Cited

U.S. PATENT DOCUMENTS

| | | | |
|---|---|---|---|
| 2005/0254444 A1* | 11/2005 | Meier et al. ................... | 370/312 |
| 2008/0144559 A1* | 6/2008 | Griswold et al. ............. | 370/311 |
| 2008/0181161 A1* | 7/2008 | Gi Kim et al. ................ | 370/312 |
| 2008/0186913 A1* | 8/2008 | Ahn et al. ..................... | 370/329 |
| 2009/0052362 A1* | 2/2009 | Meier et al. ................... | 370/311 |

* cited by examiner

*Primary Examiner* — Jung Park
(74) *Attorney, Agent, or Firm* — Muncy, Geissler, Olds & Lowe, P.C.

(57) ABSTRACT

A wireless network apparatus provides a communication connection for a wireless device. The wireless network apparatus comprises a determining module used for outputting a first determining result when the wireless device is joining a multicast group and enables a power-saving mode thereof; a media queue module used for transmitting media information to the wireless device by either a direct-transmission mode or a deferred-transmission mode; and a control module used for controlling the media queue module to disable the deferred-transmission mode and enable the direct-transmission mode to transmit the media information to the wireless device based on the first determining result outputted by the determining module.

14 Claims, 2 Drawing Sheets

MULTICAST GROUP TRANSMISSION METHOD AND WIRELESS NETWORK APPARATUS USING THE SAME

CROSS-REFERENCE TO RELATED APPLICATION

This application claims the benefit of Taiwan Patent Application No. 101107443, filed on Mar. 6, 2012, which is hereby incorporated by reference for all purposes as if fully set forth herein.

BACKGROUND OF THE INVENTION

1. Field of Invention

The present invention relates to a multicast group transmission method and a wireless network apparatus using the same, and more particularly to a dynamic multicast group transmission method with queue switching functions and a wireless network apparatus using the same.

2. Related Art

Recently, users surfing internet via wireless network are increasing day by day, such that the consumption of network bandwidth and the demand for network addresses are increasing as well. To solve the problems, the wireless network service providers and the wireless network equipment manufacturers propose a concept of multicast group through which the consumption of network bandwidth can be reduced.

Internet Group Management Protocol (IGMP) is a protocol for managing the multicast group. A node can send a host membership report message to a router, so as to create or join a multicast group in the router. When the router receives a multicast packet, such as a packet carried with multimedia information, destined to the multicast group, the multicast packet is transmitted to each node which is included in the multicast group.

In addition, when the nodes registered in the multicast group, for example wireless devices, enters into the power saving mode due to a power-saving mode being enabled for saving power or other reasons, the nodes are marked during power save mode or standby mode in the multicast group. However, according to IEEE802.11 standard, if a wireless device is unable to receive the media information transmitted by a router due to entering power-saving mode, the packet carried with media information to be transmitted from the router to all nodes registered in the multicast group must be temporarily saved until the wireless device returns to working mode. The packet will be again transmitted to the wireless device once the mark is removed from the multicast group.

As above mentioned, in the same multicast group, other wireless devices in which the power-saving mode are disabled or without the power-saving mode will be delayed in receiving media information until the wireless device returns to working mode. Therefore, it may cause a delay of receiving the media information and have an influence of fluency of receiving the media information for those wireless devices.

SUMMARY OF THE INVENTION

To solve the above-mentioned problems, the present invention provides a multicast group transmission method and a wireless network apparatus using the same. Therefore, the media information can be transmitted under the architecture of IGMP to avoid the wireless device with power-save mode enabled affecting the wireless device with power-save mode disabled, which leads to a delay in receiving the media information.

In one embodiment of the present invention, a wireless network apparatus is provided. The wireless network apparatus provides a communication connection for a wireless device, wherein the wireless network apparatus comprises: a determining module used for outputting a first determining result when the wireless device is joining a multicast group and enables a power-saving mode thereof; a media queue module used for controlling media information to be transmitted to the wireless device by either a direct-transmission mode or a deferred-transmission mode; and a control module used for controlling the media queue module to disable the deferred-transmission mode and enable the direct-transmission mode to transmit the media information to the wireless device based on the first determining result outputted by the determining module.

In one embodiment of the present invention, a multicast group transmission method is provided, and the transmission method comprises the steps of following: determining whether a wireless device is joining a multicast group and enables a power-saving mode by a determining module; outputting a first determining result when the determining module determines that the wireless device is joining the multicast group and enables the power-saving mode thereof; and controlling a media queue module to disable a deferred-transmission mode and enable a direct-transmission mode to transmit media information to the wireless device based on the first determining result by a control module.

In one embodiment of the present invention, a multicast group transmission method is provided, and the transmission method comprises the steps of following: outputting a first determining result when a determining module determines that a wireless device is joining a multicast group and enables a power-saving mode; controlling a media queue module to disable a deferred-transmission mode and enable a direct-transmission mode to transmit media information to the wireless device by a control module; and controlling the media queue module to disable the direct-transmission mode and enable the deferred-transmission mode to transmit the media information to the wireless device by the control module when the determining module determines that the wireless device is leaving the multicast group or the wireless device disables the power-saving mode.

The technical features of the present invention lie in that: the media queue module can be used to disable the deferred-transmission mode to transmit media information to the wireless devices except the one enabling power-saving mode in a same multicast group, such that the wireless devices can stably and smoothly receive media information, improve transmission quality and increase transmission speed.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
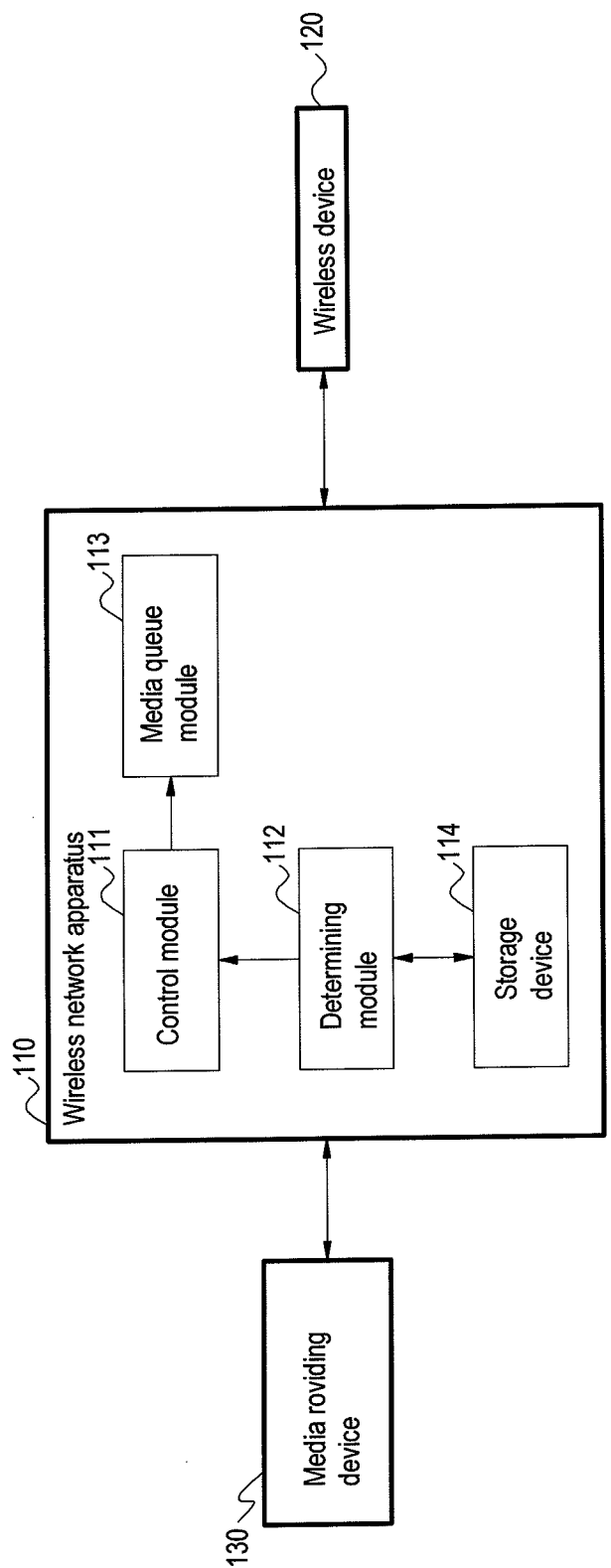
FIG. 1 shows a diagram of a wireless network systematic structure according to one embodiment of the present invention.

The present invention will become more fully understood from the detailed description given herein below for illustration only, and thus are not limitative of the present invention, and wherein:

Referring to FIG. 1, it shows a diagram of a wireless network systematic structure, which is used to depict how a wireless network apparatus 110 works in a network communication system to manage a multicast group according to one embodiment of the present invention. In one embodiment of the present invention, the wireless network system comprises a wireless network apparatus 110, a wireless device 120, and a media providing device 130.

The media providing device 130 is used for transmitting the packets containing media information to the wireless network apparatus 110 by the means of multicasting, so as to transmit the media information to the member of an assigned multicast group through the wireless network apparatus 110. In one embodiment of the present invention, the media providing device 130 is a media-playing server which can transmit media information to a specific device through various transmission technologies, such as streaming. Here, the media information includes data or information constituting images, voice, and music and so on.

The wireless device 120 receives the media information provided by the media providing device 130 through the wireless network apparatus 110. In addition, the wireless device 120 can join the multicast group by sending a join multicast group message packet to the wireless network apparatus 110, and leave the multicast group by sending a leave multicast group message packet to the wireless network apparatus 110. In one embodiment of the present invention, the join multicast group message packet or the leave multicast group message packet is the join message and the leave message specified in of IGMP standard. Moreover, when enabling the power-saving mode, the wireless device 120 sends a message packet of enabling power-saving mode to the wireless network apparatus 110 to inform that the power-saving mode of the wireless device 120 will be enabled. In one embodiment of the present invention, the message packet of enabling power-saving mode may be a power management bit of a frame control field of a frame in which the power-saving mode is configured, but not limited thereto. In one embodiment of the present invention, the wireless device 120 may be a smart phone, a tablet PC, a laptop or other devices capable of performing wireless communications or the wireless device 120 may be constituted by related modules, elements and software, but not limited thereto.

The wireless network apparatus 110 is used to provide a communication connection with the wireless device 120, and receive the media information transmitted by the media providing device 130 and then forward the media information to the wireless device 120. In one embodiment of the present invention, the wireless network apparatus 110 may be a wireless router or a wireless access point. The wireless network apparatus 110 comprises a determining module 112, a control module 111, a media queue module 113, and a storage device 114.

The storage device 114 is used to store wireless device information. In one embodiment of the present invention, the wireless device information contains the information of each wireless device 120 connected to the wireless network apparatus 110, such that the wireless device information can provide the information of whether a wireless device 120 enables or disables its power-saving mode. Here, the wireless device information includes: device identification information (for example, media access control (MAC) addresses, rates, channels, encryptions and enabling/disabling of the power-saving mode). In one embodiment of the present invention, the storage device 114 is a device database with power-saving mode enabled, which records the device identification information of every wireless devices with the power-saving mode enabled; therefore, whether a wireless device 120 enables the power-saving mode can be acquired by searching the device identification information of the wireless device from the device database with power-saving mode enabled. In one embodiment of the present invention, the storage device 114 may be a memory, a flash memory, a read-only memory, a non-volatile memory, or an equivalent, but not limited thereto.

The determining module 112 is used for outputting a first determining result when the wireless device 120 is joining a multicast group and enables the power-saving mode. In one embodiment of the present invention, when the wireless network apparatus 110 receives the join multicast group message packet sent by the wireless device 120, the determining module 112 determines whether the wireless device 120 is joining the multicast group according to the join multicast group message packet, and determines whether the wireless device 120 enables the power-saving mode according to the wireless device information stored in the storage device 114. If the wireless device information shows that the wireless device 120 enables the power-saving mode, the determining module 112 determines that the wireless device 120 enables the power-saving mode; on the other hand, if the wireless device information shows that the wireless device 120 disables the power-saving mode or has no information of power-saving mode enabled or disabled, the determining module 112 determines that the wireless device 120 disables the power-saving mode. Moreover, when determining that the wireless device 120 is joining the multicast group and enables the power-saving mode, the determining module 112 outputs a first determining result; when determines that the wireless device 120 is leaving the multicast group or disables the power-saving mode, the determining module 112 outputs a second determining result. Here, the first determining result is a first voltage level signal, such as a high voltage level signal, but not limited thereto. On the other hand, the second determining result is a second voltage level signal, such as a low voltage level signal, but not limited thereto.

It is to be noted when the wireless network apparatus 110 receives the message packet of enabling power-saving mode or the message packet of disabling power-saving mode sent from the wireless device 120, the wireless network apparatus 110 will record that the wireless device 120 enables or disables the power-saving mode. In one embodiment of the present invention, the recordings of the wireless network apparatus 110 are performed in following conditions: when the wireless network apparatus 110 receives the message packet of enabling power-saving mode from the wireless device 120, the determining module 112 records that the wireless device 120 is enabling the power-saving mode in the storage device 114; or when the wireless network apparatus 110 receives the message packet of disabling power-saving mode from the wireless device 120, the determining module 112 records that the wireless device 120 is disabling the power-saving mode in the storage device 114. In one embodiment of the present invention, the recordings of the wireless network apparatus 110 are performed in following conditions: when the wireless network apparatus 110 receives the message packet of enabling power-saving mode from the wireless device 120, the determining module 112 adds the device identification information of the wireless device 120 into the device database with power-saving mode enabled in the storage device 114; and when the wireless network apparatus 110 receives the message packet of disabling power-saving mode from the wireless device 120, the determining module 112 deletes the corresponding device identification information of the wireless devices 120 from the device database with power-saving mode enabled in the storage device 114. If the corresponding device identification information of the wireless device 120 can't be found in the device database with power-saving mode enabled, no action is performed.

A media queue module 113 is used for transmitting the media information to the wireless device 120 according to a direct-transmission mode or a deferred-transmission mode. In one embodiment of the present invention, the direct-transmission mode indicates that the media information received by the media providing device 130 is directly transmitted to the wireless device 120; however, the deferred-transmission mode indicates that the received media information is temporarily stored in a buffer area of the media providing device 130, and then is transmitted to the wireless device 120 from the buffer area after waiting a specified amount of time, wherein the specified amount of time may be, for example, a time of receiving transmission commands or a predetermined waiting time.

A control module 111 is used for controlling the media queue module 113 to disable the deferred-transmission mode and enable the direct-transmission mode to transmit the media information to the wireless device 120 based on the first determining result outputted by the determining module 112, and controlling the media queue module 113 to enable the deferred-transmission mode to transmit the media information to the wireless device 120 based on a second determining result outputted by the determining module 112. In one embodiment of the present invention, when receiving the first determining result, the control mode 111 sends a message of disabling deferred-transmission mode to the media queue module 113; therefore, the media queue module 113 disables the deferred-transmission mode and automatically switches to the direct-transmission mode, or switches to the direct-transmission mode after receiving a message of enabling direct-transmission mode sent by the control mode 111, so as to transmit the media information to the wireless device 120. Similarly, the control mode 111 sends a message of disabling direct-transmission mode to the media queue module 113 according to the second determining result outputted by the determining model 112;

therefore, the media queue module 113 automatically switches to the deferred-transmission mode, or switches to the deferred-transmission mode after receiving a message of enabling deferred-transmission mode outputted by the control mode 111, so as to control the media queue module 113 to transmit the media information to the wireless device 120 by the deferred-transmission mode. In one embodiment of the present invention, the control module 111, the determining module 112, the media queue module 113 may be more than one selected from a group consisting of a chip set, processors such as CPU, MPU, control circuits, auxiliary circuits, operation software, firmware, or related modules, elements, software, but not limited thereto.

Figure 2:
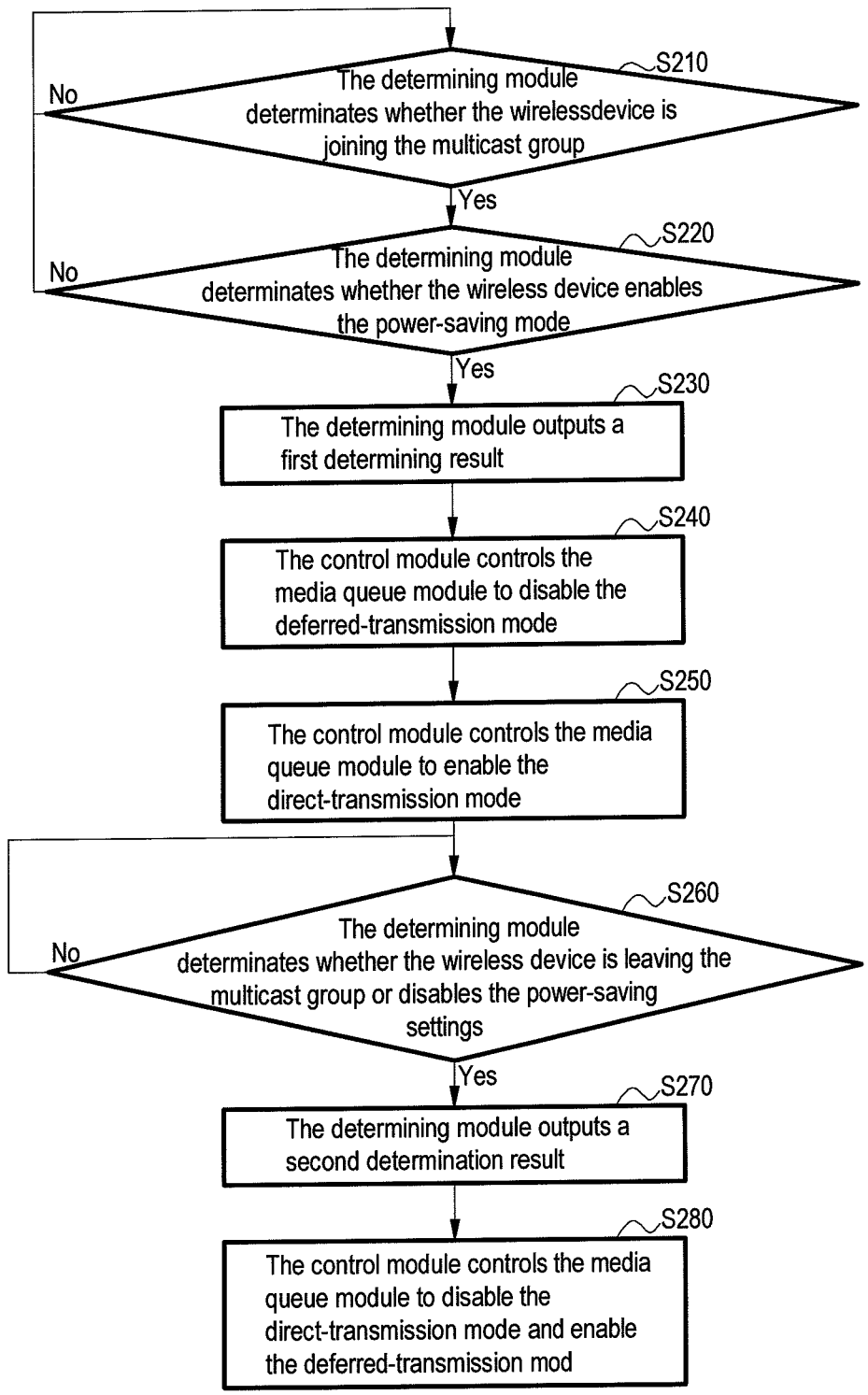
FIG. 2 shows a flow chart of multicast group transmission method for a wireless device according to one embodiment of the present invention.

Please refer to FIG. 2, it shows a flow chart of multicast group transmission method for wireless devices according to one embodiment of the present invention. Also, please refer to FIG. 1 again for explaining how the wireless network apparatus 110 performs the steps of the multicast group transmission method.

In the step S210, the determining module 112 determines whether the wireless device 120 is joining the multicast group. If yes, go to step S220; if not, keep repeating the step. In this step, the determining module 112 determinates whether the wireless device 120 sends the join multicast group message packet. When the determining module 112 determines that the join multicast group message packet is received, then determines the wireless device 120 is joining the multicast group.

In the step S220, the determining module 112 determines whether the wireless device 120 enables the power-saving mode. If yes, go to step S230; otherwise go back to step S210. In this step, the determining module 112 determines whether the wireless device 120 enables the power-saving mode based on the searched wireless device information. In one embodiment of the present invention, the determining module 112 searches the wireless device information. If the corresponding wireless device information for the wireless device 120 shows an enabled status, the determining module 120 determines that the wireless device 120 enables the power-saving mode. In one embodiment of the present invention, the determining module 112 searches the device database with power-saving mode enabled in the storage device 114. If the corresponding device identification information can be found, the determining module 112 determines that the wireless device 120 enables the power-saving mode; if the corresponding device identification information can't be found, the determining module 112 determinates that the wireless device 120 disables the power-saving mode.

In the step S230, the determining module 112 outputs a first determining result. In this step, when determining that the wireless device 120 is joining the multicast group and also enables the power-saving mode, the determining module 112 outputs the first determining result. In one embodiment of the present invention, the first determining result is a first voltage level signal.

In the step S240, the control module 111 controls the media queue module 113 to disable the deferred-transmission mode. In this step, after receiving the first determining result, the control module 111 sends a message of disabling deferred-transmission mode to the media queue module 113 to disable the deferred-transmission mode.

In step S250, the control module 111 controls the media queue module 113 to enable the direct-transmission mode to transmit the media information to the wireless device 120. In this step, the control module 111 sends a message of enabling direct-transmission mode to the media queue module 113, so as to enable the direct-transmission mode to transmit the media information to the wireless device 120. In one embodiment of the present invention, when the media queue module 113 disables the deferred-transmission mode, the direct-transmission mode is automatically enabled.

In step S260, the determining module 112 determines whether the wireless device 120 is leaving the multicast group or disables the power-saving mode. If yes, go to the step S270; if not, keep repeating the step. In this step, the determining module 112 determines that the wireless device 120 is leaving the multicast group based on the received leave multicast group message packet sent by the wireless device 120, and the determining module 112 determines that the wireless device 120 disables the power-saving mode based on the packet of disabling power-saving mode sent by the wireless device 120. In one embodiment of the present invention, if the determining module 112 searches the device database with power-saving mode enabled in the storage device 114 and can't find the corresponding device identification information of the wireless device 120 in the device database, the determining module 112 determines that the wireless device 120 disables the power-saving mode.

In the step S270, the determining module 112 outputs a second determining result. In this step, when the wireless device 120 disables the power-saving mode or is leaving the multicast group, the determining module 112 outputs a second determining result to the control module 111.

In the step S280, the control module 111 controls the media queue module 113 to disable the direct-transmission mode and enable the deferred-transmission mode to transmit the media information to the wireless device 120. In this step, when receiving the second determining result, the control module 111 sends a message of disabling direct-transmission mode to the media queue module 113, such that the media queue module 113 disables the direct-transmission mode and automatically switches to the deferred-transmission mode. Or, when receiving the message of enabling deferred-transmission mode sent by the control module 111, the media queue module 113 switches to the deferred-transmission mode to transmit the media information to the wireless device 120.

Through above-mentioned steps, for the wireless device joining the multicast group and enabling the power-saving mode, the media queue module will disable the deferred-transmission mode and enable the direct-transmission mode to transmit the media information to the wireless device. Therefore, because the deferred-transmission mode which causes transmission delay in the multicast group is disabled, the wireless device will not be affected by the transmission delay such that the transmission delay caused by the member of multicast group enabling the power-saving mode can be solved.

Although the present invention is disclosed through the above embodiments, the embodiments are not intended to limit the present invention. Equivalent replacements like variations and modifications made by any person skilled in the similar art without departing from the spirit and scope of the present invention shall still fall within the protection scope of the present invention.

What is claimed is:

1. A wireless network apparatus providing a communication connection for a wireless device, wherein the wireless network apparatus comprises:
    a determining module used for outputting a first voltage level signal when determining that the wireless device is joining a multicast group according to a join multicast group message packet and determining that the wireless device enables a power-saving mode thereof;
    a media queue module used for transmitting media information to the wireless device by either a direct-transmission mode or a deferred-transmission mode; and
    a control module used for controlling the media queue module to disable the deferred-transmission mode and enable the direct-transmission mode to transmit the media information to the wireless device which is in the power-saving mode and joined the multicast group based on the first voltage level signal outputted by the determining module,
    wherein the determining module outputs a second voltage level signal when the wireless device disables the power-saving mode or is leaving the multicast group, the control module controls the media queue module to disable the direct-transmission mode and enable the deferred-transmission mode to transmit the media information to the wireless device based on the second voltage level signal outputted by the determining module.

2. The wireless network apparatus as claimed in claim 1, wherein the determining module determines that the wireless device is joining a multicast group based on a join multicast group message packet transmitted by the wireless device.

3. The wireless network apparatus as claimed in claim 1, wherein further comprises:
    a storage device used for storing wireless device information,
    wherein the determining module determines that the wireless device enables the power-saving mode based on the wireless device information.

4. The wireless network apparatus as claimed in claim 1, wherein further comprises:
    a storage device used for storing a device database with power-saving mode enabled,
    wherein the determining module determines whether the wireless device enables the power-saving mode based on the device database with power-saving mode enabled.

5. A multicast group transmission method, the method comprises steps of following:
    determining whether a wireless device is joining a multicast group and enables a power-saving mode by a determining module;
    outputting a first voltage level signal when the determining module determines that the wireless device is joining the multicast group and enables the power-saving mode thereof; and
    controlling a media queue module to disable a deferred-transmission mode and enable a direct-transmission mode to transmit media information to the wireless device which is in the power-saving mode and joined the multicast group based on the first voltage level signal by a control module,
    wherein, when the determining module determines that the wireless device is leaving the multicast group or the wireless device disables the power-saving mode, the control module controls the media queue module to disable the direct-transmission mode and enable the deferred-transmission mode to transmit the media information to the wireless device.

6. The multicast group transmission method as claimed in claim 5, wherein the deferred-transmission mode is disabled by the control module which sends a message of disabling deferred-transmission mode to the media queue module, so as to disable the deferred-transmission mode.

7. The multicast group transmission method as claimed in claim 5, wherein whether a wireless device is joining a multicast group is determined by the determining module based on a received join multicast group message packet transmitted by the wireless device.

8. The multicast group transmission method as claimed in claim 5, wherein whether a wireless device enables a power-saving mode is performed by the determining module, and the determining module determines that the wireless device enables the power-save mode if wireless device information of a storage device corresponding to device identification information of the wireless device records an enabled status.

9. The multicast group transmission method as claimed in claim 5, wherein whether a wireless device enables a power-saving mode is performed by the determining module, and the determining module determines that the wireless device enables the power-save mode if device identification information in a device database with power-saving mode enabled corresponding to device identification information of the wireless device is found.

10. A multicast group transmission method, the method comprises:
    outputting a first voltage level signal when a determining module determines that a wireless device is joining a multicast group and enables a power-saving mode;
    controlling a media queue module to disable a deferred-transmission mode and enable a direct-transmission mode to transmit media information to the wireless device which is in the power-saving mode and joined the multicast group by a control module; and controlling the media queue module to disable the direct-transmission mode and enable the deferred-transmission mode to transmit the media information to the wireless device by the control module when the determining module determines that the wireless device is leaving the multicast group or the wireless device disables the power-saving mode, wherein, when the determining module determines that the wireless device is leaving the multicast group or the wireless device disables the power-saving mode, the control module controls the media queue module to disable the direct-transmission mode and enable the deferred-transmission mode to transmit the media information to the wireless device.

11. The multicast group transmission method as claimed in claim 10, wherein the determining module determining whether the wireless device is joining a multicast group is based on a received join multicast group message packet transmitted by the wireless device.

12. The multicast group transmission method as claimed in claim 10, wherein the determining module determining whether the wireless device enables the power-saving mode is based on wireless device information, and if the wireless device information records that the wireless device enables the power-saving mode, the determining module determines that the wireless device enables the power-saving mode.

13. The multicast group transmission method as claimed in claim 10, wherein the determining module determining whether the wireless device enables the power-saving mode is based on a device database with power-saving mode enabled, and if the device database with power-saving mode enabled includes information of the wireless device, the determining module determines that the wireless device enables the power-saving mode.

14. The multicast group transmission method as claimed in claim 10, wherein controlling a media queue module to disable a deferred-transmission mode and enable a direct-transmission mode to transmit media information to the wireless device by a control module further comprises:

sending a message of disabling deferred-transmission mode to the media queue module by the control module in order to control the media queue module to disable the deferred-transmission mode to transmit the media information to the wireless device; and sending a message of enabling direct-transmission mode to the media queue module by the control module in order to control the media queue module to enable the direct-transmission mode to transmit the media information to the wireless device.

* * * * *